US007971355B2

(12) United States Patent
Scharp

(10) Patent No.: US 7,971,355 B2
(45) Date of Patent: Jul. 5, 2011

(54) METHOD FOR ATTACHING A RING ELEMENT TO A PISTON FOR AN INTERNAL COMBUSTION ENGINE

(75) Inventor: Rainer Scharp, Vaihingen (DE)

(73) Assignee: MAHLE International GmbH, Stuttgart (DE)

( * ) Notice: Subject to any disclaimer, the term of this patent is extended or adjusted under 35 U.S.C. 154(b) by 437 days.

(21) Appl. No.: 12/316,017

(22) Filed: Dec. 9, 2008

(65) Prior Publication Data

US 2009/0158925 A1 Jun. 25, 2009

(30) Foreign Application Priority Data

Dec. 20, 2007 (DE) ........................ 10 2007 061 600
Aug. 19, 2008 (DE) ........................ 10 2008 038 325

(51) Int. Cl.
*B23P 15/10* (2006.01)

(52) U.S. Cl. ........... 29/888.042; 29/888.04; 29/888.044; 29/888.048; 29/418; 92/222

(58) Field of Classification Search ............ 29/888.042, 29/888.04, 888.044, 888.048, 888.049, 418; 92/176, 216, 222; 123/193.6
See application file for complete search history.

(56) References Cited

U.S. PATENT DOCUMENTS 2,244,008 A 6/1941 Hazen et al.
3,613,521 A * 10/1971 Itano ................................ 92/186
4,011,797 A 3/1977 Cornet
4,651,631 A 3/1987 Avezou
4,838,149 A * 6/1989 Donnison et al. ............... 92/222
2006/0278180 A1 12/2006 Scharp

FOREIGN PATENT DOCUMENTS

| | | |
|---|---|---|
| DE | 830 127 | 1/1952 |
| DE | 30 32 671 | 8/1952 |
| DE | 24 34 902 | 2/1975 |
| DE | 1 23 962 | 1/1977 |
| DE | 30 32 671 | 3/1982 |
| DE | 82 25 318 | 1/1983 |
| DE | 195 01 416 | 7/1996 |
| DE | 199 15 782 | 11/2000 |
| DE | 100 63 568 | 7/2002 |

(Continued)

OTHER PUBLICATIONS

International Search Report of PCT/DE2008/002074 in German.

(Continued)

*Primary Examiner* — David P Bryant
*Assistant Examiner* — Ryan J Walters
(74) *Attorney, Agent, or Firm* — Collard & Roe, P.C.

(57) ABSTRACT

A method for attaching a ring element to a piston for an internal combustion engine, in which the ring element is screwed onto the piston body by a thread applied to the radially outer surface of a part of the piston crown, a circumferential groove that is open towards the top is formed into the piston crown in the region of the thread, the groove is filled with solder material, the piston is heated until the solder material liquefies and flows between the thread channels of the thread and subsequently, the piston is cooled. As a result, a secure screw connection between the basic piston body and the ring element is obtained. Furthermore, the cooling channel is sealed with regard to the combustion gases, which stand under high pressure and act on the piston crown.

7 Claims, 1 Drawing Sheet

FOREIGN PATENT DOCUMENTS

| | | |
|---|---|---|
| DE | 101 28 737 | 1/2003 |
| DE | 102 09 331 | 9/2003 |
| DE | 103 25 914 | 12/2004 |
| DE | 103 40 292 | 4/2005 |
| DE | 699 26 583 | 1/2006 |
| DE | 10 2005 044 597 | 3/2007 |
| DE | 10 2007 005 268 | 8/2007 |
| DE | 600 35 835 | 12/2007 |
| EP | 0 330 005 | 8/1989 |
| GB | 916926 | 1/1963 |
| WO | WO 2004/111420 | 12/2004 |
| WO | WO 2005/024216 | 3/2005 |
| WO | WO 2009/033446 | 3/2009 |

OTHER PUBLICATIONS

"Furnace Brazing of Steels; Assembly for Brazing," in Metals Handbook, Ninth Edition, American Society for Metals, Jan. 1983, Welding, Brazing and Soldering, [Metals Handbook], vol. 6, pp. 939-943. XP-002532666. (ISR).

* cited by examiner

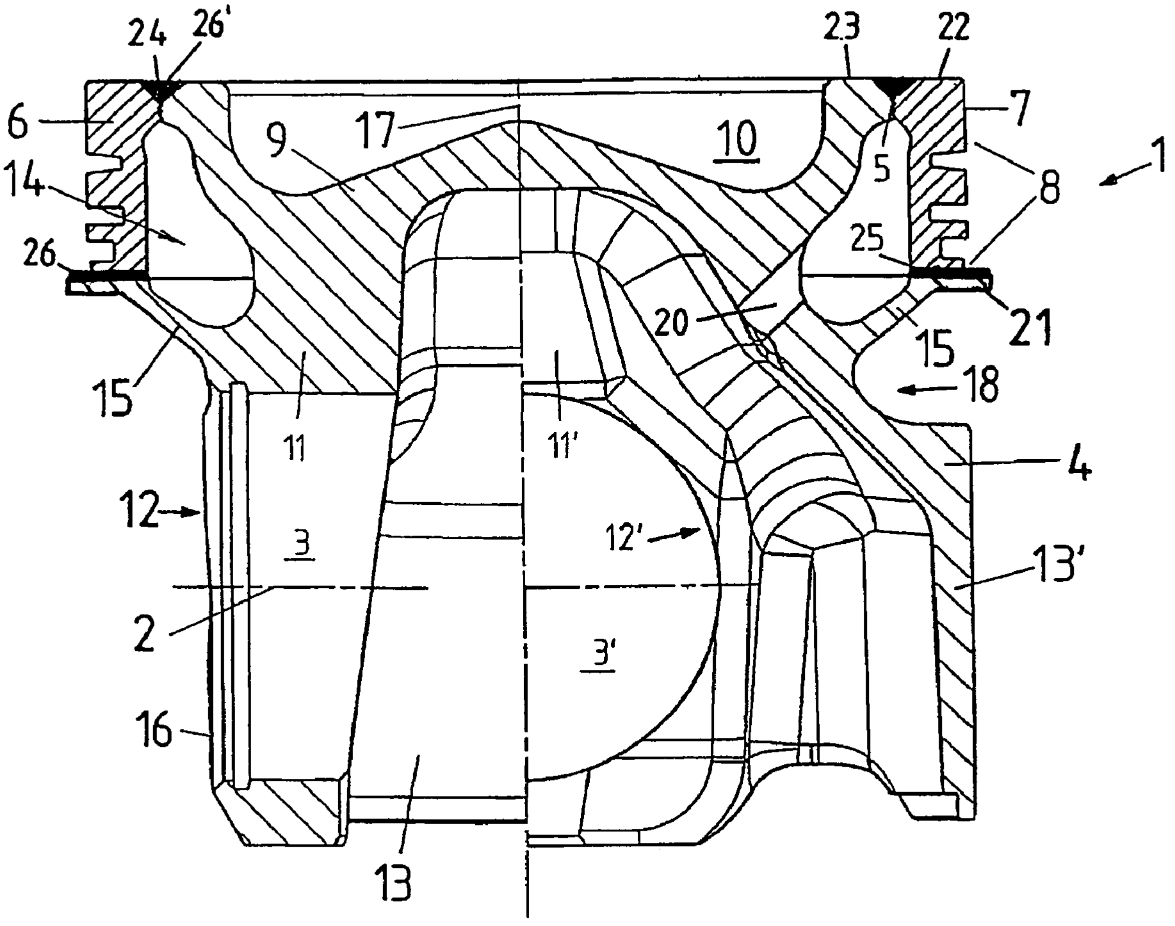
24
26'
23
22
6
17
9
10
7
5
8
1
14
25
26
20
21
15
15
18
11
11'
4
12
12'
13'
3
2
3'
16
13

METHOD FOR ATTACHING A RING ELEMENT TO A PISTON FOR AN INTERNAL COMBUSTION ENGINE

CROSS REFERENCE TO RELATED APPLICATIONS

Applicant claims priority under 35 U.S.C. 119 of German Application No. 10 2007 061 600.9 filed Dec. 20, 2007 and German Application No. 10 2008 038 325.2 filed Aug. 19, 2008.

BACKGROUND OF THE INVENTION

1. Field of the Invention

The invention relates to a method for attaching a ring element to a piston for an internal combustion engine.

2. The Prior Art

PCT application WO 2004/111420 A1 describes a method in which a ring element is screwed onto a basic piston body, which forms the radially outer part of the piston crown and together with the basic piston body, a circumferential, radially outer cooling channel, disposed close to the piston crown. In this connection, thermal and mechanical stresses on the piston that are permanently higher can cause the screw connection between the basic piston body and the ring element to come loose, which can lead to damage of the cylinder working surface.

SUMMARY OF THE INVENTION

It is therefore an object of the invention to avoid this disadvantage of the state of the art. This object is accomplished by a method for attaching a ring element to a piston for an internal combustion engine having a basic piston body that forms the radially inner part of the piston crown, and that has two pin bosses connected with the piston crown by way of a pin boss support. The pin bosses are connected with one another by way of two skirt elements. The ring element is connected with the basic piston body by way of a thread applied to the radially outer surface of the inner part of the piston crown. This ring element forms the radially outer part of the piston crown, and, together with the basic piston body, forms a circumferential cooling channel disposed radially on the outside and close to the piston crown. The lower face surface of the ring element comes into contact with the piston-crown-side surface of a circumferential molded-on part affixed to the radially outer surface of the piston, at the level of the pin boss supports. In the method, a projection that widens the surface radially towards the outside is affixed onto the molded-on part, and the radially outer edge of the inner part and the radially inner edge of the outer part of the piston crown are each provided with a bevel. The ring element is screwed onto the basic piston body by way of the thread, and the two bevels of the inner and the outer part of the piston crown form a groove that is V-shaped in cross-section. The groove is filled and the piston-crown-side surface of the projection is covered with solder material. The piston is heated until the solder material liquefies, and flows between the thread channels of the thread and between the lower face surface of the ring element and the piston-crown-side surface of the molded-on part. The piston is then cooled and the part of the projection that projects beyond the radially outer surface of the ring element is removed.

In one embodiment, the basic piston body and ring element are made of AFP steel, and the solder material contains copper or nickel. Possible forms for the solder material are a solder paste, solder wire or solder foil, among others.

The step of heating preferably takes place at a temperature between 1050° C. and 1250° C., and the piston is preferably cooled to a temperature of less than 600° C., at a cool-off speed of 5 to 50° K/min, in an oxygen-free atmosphere. The step of cooling can take place in a vacuum or a reducing atmosphere.

The additional solder connection according to the invention creates a more secure attachment of the ring element to the basic piston body. Furthermore, as a result, the cooling channel formed by the ring element and by the basic piston body is sealed with regard to the combustion gases, which are under high pressure and act on the piston crown.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

The drawing shows a piston for an internal combustion engine in a sectional diagram that consists of two halves, which represent two longitudinal sections of the piston, offset by 90°.

DETAILED DESCRIPTION OF THE PREFERRED EMBODIMENT

The FIGURE shows a piston 1 for an internal combustion engine in a sectional diagram that consists of two halves, of which the left half represents a section of the piston 1 along a longitudinal axis 2 of a pin bore 3, and the right half represents a longitudinal section of the piston 1 offset to the first by 90°. Piston 1 consists of a basic piston body 4 onto which a ring element 6 is screwed by way of a thread 5 on the piston crown side, which element carries a top land 7 and a ring belt 8 of piston 1. Basic piston body 4 and ring element 6 can be produced from steel, such as, in the case of the present exemplary embodiment, from ferrite/perlite AFP steel that hardens by precipitation, or from cast iron.

Basic piston body 4 is configured in one piece and has a combustion bowl 10 in the region of piston crown 9. Two pin bosses 12, 12', each having a pin bore 3, 3', are each formed onto the piston crown 9 by way of a pin boss support 11, 11'; their face surfaces 16 are disposed set back relative to ring element 6, in the direction of longitudinal piston axis 17. The solder material can be in the form of a solder paste, solder wire or solder foil. Pin bosses 12, 12' are connected with one another by way of skirt elements 13, 13'. Between skirt elements 13, 13' and the upper region of piston 1 that carries ring element 6, basic piston body 4 has recesses 18 that are disposed, in the present exemplary embodiment, in the region of skirt elements 13, 13' of basic piston body 4, running partially around the circumference.

Basic piston body 4 forms a ring-shaped cooling channel 14, together with ring element 6, in the region of piston crown 9; this channel is worked partly into basic piston body 4 and partly into ring element 6. In the direction of pin boss 12, cooling channel 14 is covered by a molded-on part 15 of basic piston body 4, which lies radially on the outside and is disposed at the level of pin boss supports 11, 11'. On the piston crown side, molded-on part 15 is provided, radially on the outside, with a collar-shaped projection 21 whose radial dimension is greater than the radial outside dimension of ring belt 8. In the FIGURE, an outflow opening 20 of cooling channel 14 can also be seen.

In the production of piston 1, solder material can be applied to the surfaces of basic piston body 4 and of ring element 6 that enter into contact with one another, before ring element 6 is screwed onto basic piston body 4 and piston 1 is heated in an oven in order to liquefy the solder material.

However, the production process is made cheaper and simpler if, during production of piston 1, first both the radially inner, piston-crown-side edge of radially outer part 22 of piston crown 9, formed by ring element 6, and the radially outer, piston-crown-side edge of radially inner part 23 of piston crown 9 formed by basic piston body 4 are provided with a bevel, so that when ring element 6 is screwed onto basic piston body 4 by way of thread 5, until radially outer part 22 of piston crown 9 lies in a plane with radially inner part 23 of piston crown 9, a circumferential groove 24, V-shaped in cross-section, is obtained.
In this connection, the lower face surface of ring element 6 comes to rest on surface 25 of molded-on part 15.

Subsequently, groove 24 is filled with solder material 26', and projection 21 on the piston crown side is also covered with solder material 26. A solder paste having a high melting point, produced on the basis of copper or nickel, has proven to be advantageous. It is also possible to lay a solder wire or a solder foil into groove 24 and onto the surface of projection 21; these are also produced on the basis of copper or nickel.

In an oven, piston 1 is then heated to a temperature between 900° C. and 1300° C., or, in the case of the present exemplary embodiment, between 1050° C. and 1250° C., whereby solder material 26' liquefies to such an extent that it flows into the thread channels of thread 5. The solder material 26 situated on the surface of projection 21 also liquefies and penetrates between surface 25 of molded-on part 15 and the lower face side of ring element 6.

Piston 1 is subsequently removed from the oven, whereby solder material 26, 26' situated in thread 5 and between the surfaces of molded-on part 15 and ring element 6 hardens, within the framework of controlled cooling of piston 1, at a cool-off speed of 5 to 50° K/min, to a temperature of less than 600° C.; it yields a secure screw connection between basic piston body 4 and ring element 6, and leads to fixation of ring element 6 on molded-on part 15. In the case of the present exemplary embodiment, the AFP steel of which basic piston body 4 and ring element 6 consist undergoes precipitation hardening during cooling. To prevent scaling of the steel surface, the cooling process takes place in an oxygen-free atmosphere, preferably under a vacuum or in a reducing atmosphere.

The part of projection 21 that projects beyond the radially outer surface of ring element 6 is subsequently lathed off.

Other advantages of the screw connection secured with solder material 26' consist in the fact that in this way, the heat flow between combustion bowl 10, which is subject to great thermal stress, and ring element 6 is improved, so that the thermal stress on the radially inner part 23 of piston crown 9 is reduced. Furthermore, a seal is produced by the solder material in thread 5 of cooling channel 14, with regard to the combustion gases that stand under high pressure and act on piston crown 9.

Accordingly, while only a few embodiments of the present invention have been shown and described, it is obvious that many changes and modifications may be made thereunto without departing from the spirit and scope of the invention.

REFERENCE SYMBOL LIST

1 piston
2 longitudinal axis of the pin bores
3 pin bore
4 basic piston body
5 thread
6 ring element
7 top land
8 ring belt
9 piston crown
10 combustion bowl
11, 11' pin boss supports
12, 12' pin bosses
13, 13' skirt element
14 cooling channel
15 molded-on part
16 face surface
17 longitudinal piston axis
18 recess
19 inflow opening
20 outflow opening
21 projection
22 radially outer part of piston crown 9
23 radially inner part of piston crown 9
24 groove
25 surface of molded-on part 15
26, 26' solder material

What is claimed is:

1. A method for attaching a ring element to a piston for an internal combustion engine, the piston having a basic piston body that forms a radially inner part of a piston crown, and having two pin bosses each connected with the piston crown by way of a pin boss support, which pin bosses are connected with one another by way of two skirt elements, wherein a ring element is connected with the basic piston body by way of a thread applied to a radially outer surface of the inner part of the piston crown, said ring element forming a radially outer part of the piston crown, and, together with the basic piston body, forms a circumferential cooling channel disposed radially on the outside and close to the piston crown, and wherein a lower face surface of the ring element comes into contact with a piston-crown-side surface of a circumferential molded-on part affixed to the radially outer surface of the piston, at a level of the pin boss supports, the method comprising the following steps:

providing a projection on the molded-on part, said projection widening the piston-crown-side surface of the molded-on part radially to an outside;

providing a radially outer edge of the inner part and a radially inner edge of the outer part of the piston crown with a bevel;

screwing the ring element onto the basic piston body by way of the thread, wherein the two bevels of the inner and the outer part of the piston crown form a groove that is V-shaped in cross-section;

filling the groove and covering a piston-crown-side surface of the projection with solder material;

heating the piston until the solder material liquefies and flows between thread channels of the thread and between the lower face surface of the ring element and the piston-crown-side surface of the molded-on part;

cooling the piston; and removing a part of the projection that projects beyond the radially outer surface of the ring element.

2. The method according to claim 1, wherein the basic piston body and ring element are made of AFP steel, the solder material contains copper or nickel, the piston is heated to a temperature between 1050° C. and 1250° C., and the piston is cooled to a temperature of less than 600° C., at a cool-off speed of 5 to 50° K/min, in an oxygen-free atmosphere.

3. The method according to claim 2, wherein said step of cooling takes place in a vacuum.

4. The method according to claim 2, wherein said step of cooling takes place in a reducing atmosphere.

5. The method according to claim 1, wherein the solder material is in the form of a solder paste.

6. The method according to claim 1, wherein the solder material is in the form of a solder wire.

7. The method according to claim 1, wherein the solder material is in the form of a solder foil.

* * * * *